United States Patent [19]

Allan

[11] Patent Number: 4,961,324

[45] Date of Patent: Oct. 9, 1990

[54] REFRIGERATED BEVERAGE CONTAINER

[76] Inventor: Barry S. Allan, 5179 El Claro Cir., West Palm Beach, Fla. 33415

[21] Appl. No.: 470,263

[22] Filed: Jan. 25, 1990

[51] Int. Cl.$^5$ .............................................. B67D 5/62
[52] U.S. Cl. ...................................... 62/400; 62/438; 62/457.4; 62/457.8
[58] Field of Search .................... 62/457.4, 457.8, 438, 62/400

[56] References Cited

U.S. PATENT DOCUMENTS

| | | | |
|---|---|---|---|
| 592,781 | 11/1897 | Hertwig | 62/457.8 X |
| 2,564,165 | 8/1951 | Magis | 62/457.8 |
| 2,817,458 | 12/1957 | Amigone | 62/400 X |
| 3,807,194 | 4/1974 | Bond | 62/438 X |
| 4,204,613 | 5/1980 | Terzian et al. | 62/400 X |
| 4,531,381 | 7/1985 | Toro et al. | 62/457.4 X |
| 4,577,474 | 3/1986 | Peterson | 62/457.4 |

*Primary Examiner*—Lloyd L. King
*Attorney, Agent, or Firm*—Leon Gilden

[57] ABSTRACT

Apparatus is set forth wherein a central cylindrical body including a threadedly securable cap mounted at lowermost end of the cylindrical body and an upper cap threadedly mounted to an upper end of the cylindrical body. The upper cap includes a spout conduit diametrically disposed about an upper surface of the cap with an internally threaded boss member in fluid communication with the spout conduit to receive a threaded beverage container therewithin. An upper and lower gel refrigerant chamber is mounted within the cylindrical body and within the lower cap. The lower cap further includes a spring mounted within a bore positioned within the lower cap to direct the container upwardly towards the upper cap to maintain fluid communication therewith. A threadedly removable spout cap is mounted to the spout chamber's terminal end which is oriented beyond the cylindrical wall defined by the cylindrical body.

9 Claims, 4 Drawing Sheets

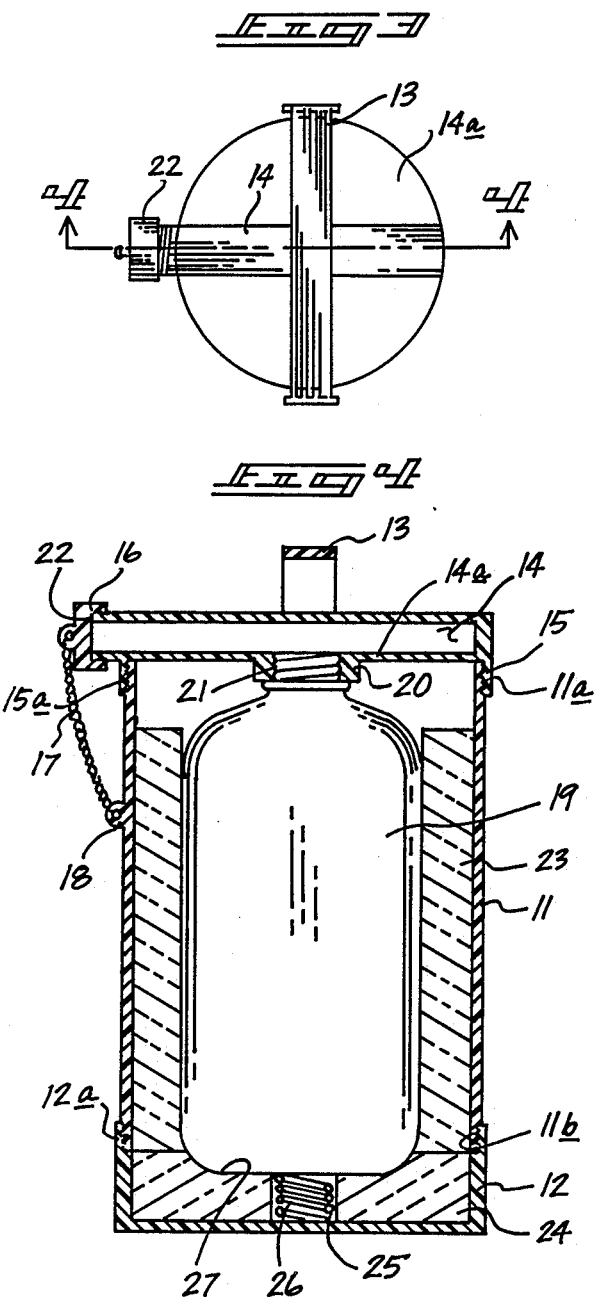

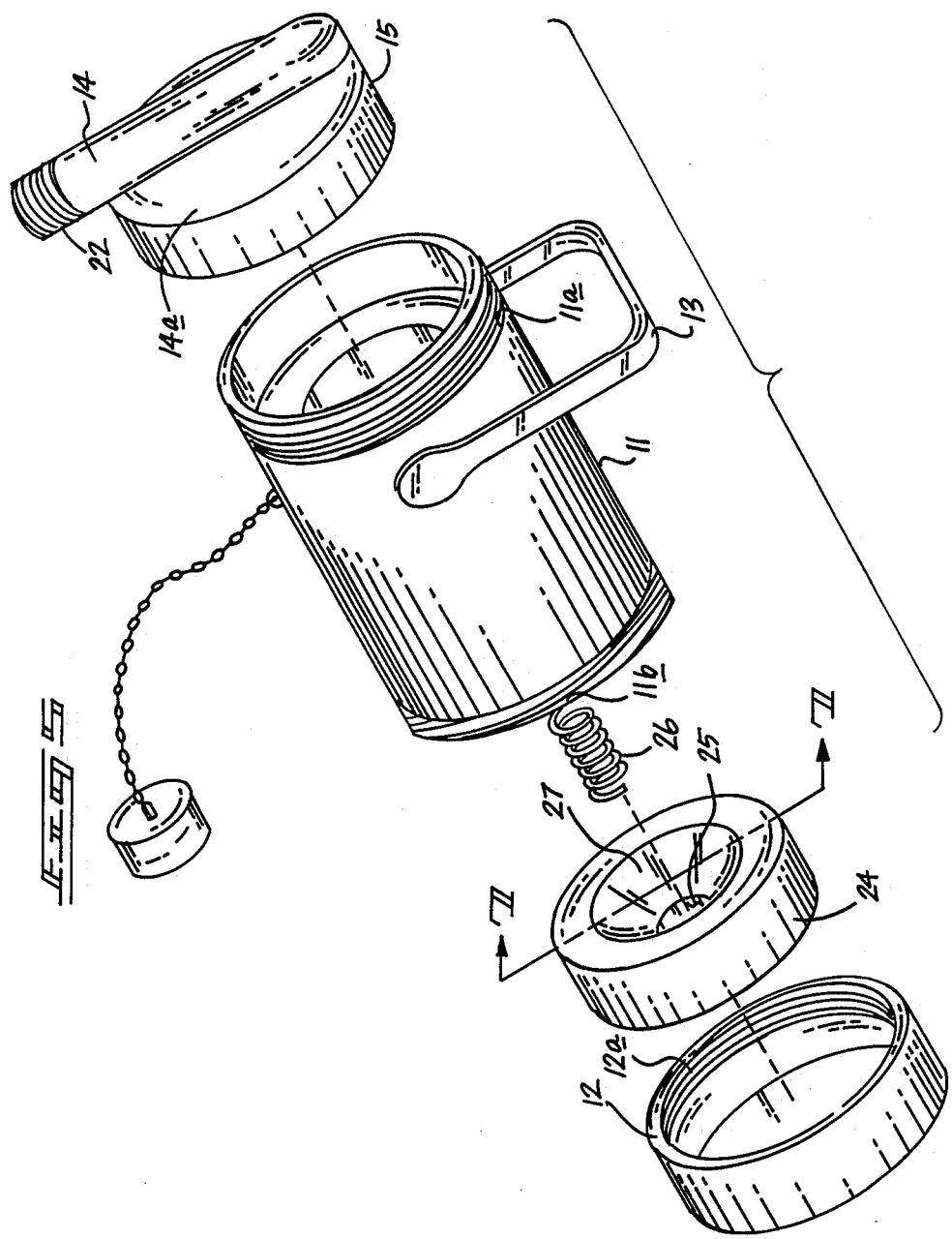

REFRIGERATED BEVERAGE CONTAINER

BACKGROUND OF THE INVENTION

1. Field of the Invention

The field of the invention relates to refrigerant containers, and more particularly pertains to a new and improved refrigerated beverage container where in the same is provided to support and maintain at cooling temperatures a container by therewithin and enable directing of fluid from the container body exteriorly there of.

2. Description of the Prior Art

Refrigerated containers of various types are well known in the prior art. The containers of the prior art have typically been of construction to releaseably mount the container therewithin to enable dispensing of fluid from the container once removed from the storage compartment of an associated refrigerant container. Examples of the prior art include GARDNER U.S. Pat. No. 4,255,944 wherein a server was provided for a beverage container mounted therewithin wherein the server defines a cylindrical body formed with an underlying refrigerant mounted within the server.

RUGGIERI U.S. Pat. No. 3,034,305 provides a portable refrigerant unit wherein an interior chamber is spaced from an exterior wall to receive a cooling fluid there with in to enable chilling of a beverage contained within a central chamber. The central chamber includes a cap member extending exteriorly of the side walls to enable dispensing of fluids therefrom.

PUTNAM U.S. Pat. No. 4,537,044 sets forth a portable type storage container including a cooling chamber mounted overlying an underlying compartment to provide a controlled temperature for underlying food.

SIMILA U.S. Pat. No. 4,638,645 provides a beverage container wherein coaxially mounted containers are provided with a space therebetween to mount a cooling chamber with a cap securable to the inner container for dispensing of a beverage therewithin.

STONER U.S. Pat. No. 3,302,428 provides a cup formed with a refrigerant type fluid to maintain at a cooling temperature a beverage container sideably mounted therewithin.

As such, may be appreciated there continues to be a need for new and improved refrigerated beverage container wherein the same utilizes selectively disposable beverage containers with an associated pouring spout to enable ease of use and effectiveness in construction in the dispensing of beverage fluids contained therewithin.

SUMMARY OF THE INVENTION

In view of the foregoing disadvantages inherent in the known types of refrigerated containers now present in the prior art, the present invention provides an improved refrigerated beverage container wherein the same selectively mounts a disposable beverage container to provide ease of dispensing of fluid from within the beverage container as desired. As such, the general purpose of the present invention, which will be described subsequently in greater detail, is to provide a new and improved refrigerated beverage container which has all the advantages of the prior art refrigerated containers and none of the disadvantages.

To attain this, the refrigerated beverage container includes apparatus is set forth wherein a central cylindrical body including a threadedly securable cap mounted at lowermost end of the cylindrical body and an upper cap threadedly mounted to an upper end of the cylindrical body. The upper cap includes a spout conduit diametrically disposed about an upper surface of the cap with an internally threaded boss member in fluid communication with the spout conduit to receive a threaded beverage container therewithin. An upper and lower gel refrigerant chamber is mounted within the cylindrical body and within the lower cap. The lower cap further includes a spring mounted within a bore positioned within the lower cap to direct the container upwardly towards the upper cap to maintain further communication therewith. A threadedly removable spout cap is mounted to the spout chamber's terminal end which is oriented beyond the cylindrical wall defined by the cylindrical body.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved refrigerated beverage container which has all the advantages of the prior art refrigerated beverage container and none of the disadvantages.

It is another object of the present invention to provide a new and improved refrigerated beverage container which may be easily and efficiently manufactured and marketed.

It is a further object of the present invention to provide a new and improved refrigerated beverage container which is of a durable and reliable construction.

An even further object of the present invention is to provide a new and improved refrigerated beverage container which is susceptible of a low cost of manufacture with regard to both materials and labor, and which accordingly is then susceptible of low prices of sale to the consuming public, thereby making such refrigerated beverage containers economically available to the buying public.

Still yet another object of the present invention is to provide a new and improved refrigerated beverage container which provides in the apparatuses and methods of the prior art some of the advantages thereof, while simultaneously overcoming some of the disadvantages normally associated therewith.

Still another object of the present invention is to provide a new and improved refrigerated beverage container which may be compactly stored when not being utilized.

Yet another object of the present invention is to provide a new and improved refrigerated beverage container wherein the same receivably mounts for ease of dispensing and use a disposable beverage container therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will becoome apparent when consideration is given to the following detailed description thereof. Such description makes reference to the annexed drawings wherein:

FIG. 3 is a top orthographic view of the instant invention.

FIG. 4 is an orthographic view taken along lines 4—4 of FIG. 3 in the direction indicated by the arrows.

FIG. 5 is an isometric exposed view of the instant invention.

DESCRIPTION OF THE PREFERRED EMBODIMENT

Figure 1:
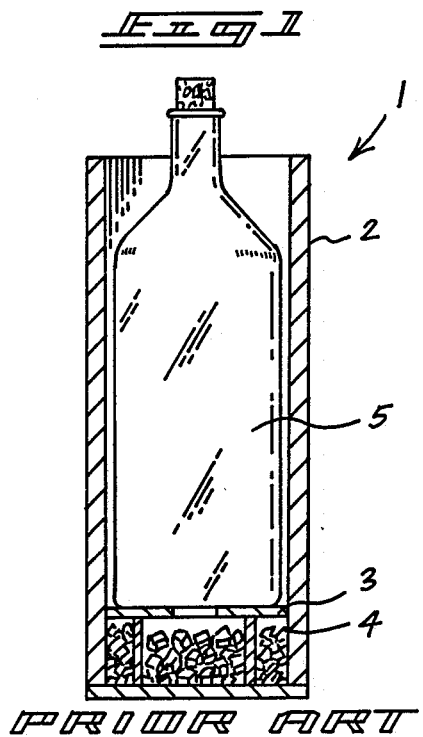
FIG. 1 is an orthographic cross-sectional view of a typical prior art beverage storage container.
Figure 2:
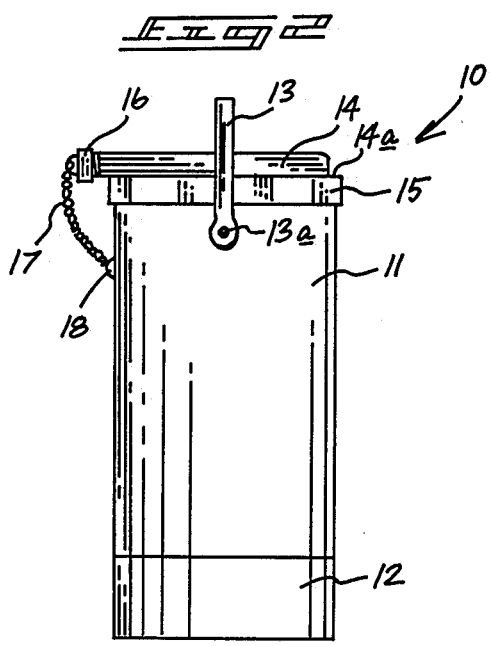
FIG. 2 is an orthographic view taken elevation of the instant invention.
Figure 6:
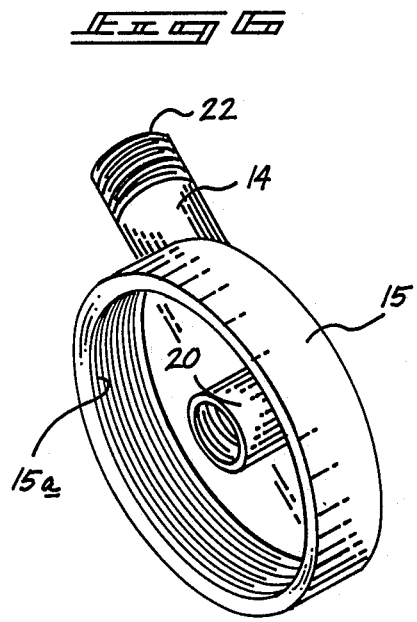
FIG. 6 is an isometric illustration of the top cap of the instant invention.

With reference now to the drawings, and in particular to FIGS. 1 to 7 thereof, a new and improved refrigerated beverage container embodying the principles and concepts of the present invention and generally designated by the reference numeral 10 will be described.

FIG. 1 is illustrative of a typical prior art device 1 wherein a central cylindrical container 2 is formed with a floor 3 overlying a compartment 4 for receiving a predetermined quantity of a refrigerant such as ice 4 therewithin to maintain an overlying bottle 5 in a chilled manner.

More specifically, the refrigerated beverage container 10 of the instant invention essentially comprises, a central container body 11 defined as a tubular member coaxially aligned and formed with upper threads 11a and lower threads 11b formed within respective upper and lower ends of an exterior surface of the container body 11. A threadedly securable bottom cap 12 is threadedly securable to the lower threads 11b and includes a internally threaded skirt securable to the lower threads 11b as illustrated in FIG. 4 for example. A U-shaped handle 13, formed with downwardly extending legs, is diametrically pivoted adjacent a top end of the container body 11. A top cap 15 formed with an annular internally threaded skirt 15a is threadedly mounted to the container body about the upper threads 11a. The top cap 15 includes a spout conduit 14 diametrically aligned and formed across a top surface 14a of the top cap 15 wherein a forward threaded terminal end of the spout conduit 14 threadedly receives a spout cap 16 securable thereto. The spout cap 16 includes a flexible tether line 17 mounted to an anchor tab 18 secured to an exterior surface of the container body 11 to prevent loss of the spout cap 16.

A polymeric beverage container 19 is positionable interiorly of the central container body 11 coaxially aligned with the axis of the container body 11 wherein the upper threaded end of the container 20 defines a threaded spout 21 receivable within an internally threaded boss 20 that is coaxially mounted to the top wall 20 for communication with the interior cavity of the spout conduit 14 as illustrated in FIG. 4. Upon threadedly interengageing the threaded spout 21 with the internally threaded boss 20, fluid from within the container 19 may be directed through the conduit 14 exteriorly thereof from the spout 14. It should be noted, as illustrated in FIG. 4, that the forward terminal end of the conduit 14 extends beyond the side wall of the body 11 for convenience of pouring as well as convenience of securing the spout cap 16 thereto.

Figure 7:
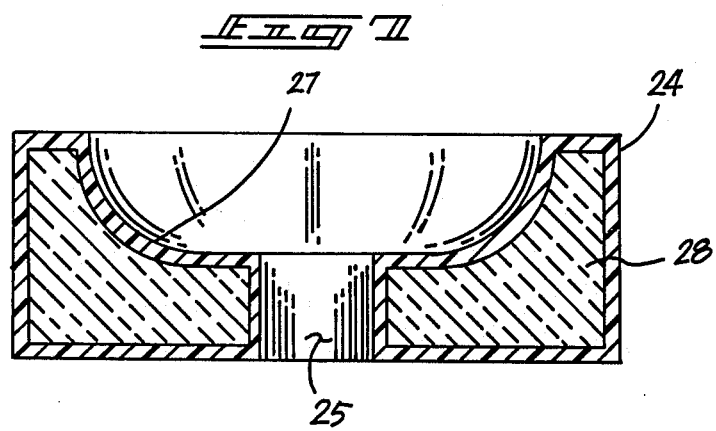
FIG. 7 is an orthographic cross-sectional view taken along the lines 7—7 of FIG. 5 in the direction indicated by the arrows.

A first gel chamber refrigerant 23 is defined as a tubular member with a diameter equal to the external diameter of the polymeric beverage container 19 with an external diameter essentially equal to an internal diameter defined by the container body 11. The first gel chamber refrigerant is of an axial length as illustrated somewhat less than that defined by the body 11 but it is understood may extend the entire length thereof but should at least be of a axial length substantially as defined by the beverage container 19. A second gel chamber refrigerant 24 is formed within the bottom cap 12 and is defined by an external diameter equal to an internal diameter of the container body 11 and includes a cylindrical bore 25 coaxially aligned with the container body 11 and the bottom cap 12. A coil spring 26 is mounted within the cylindrical bore of the second gel chamber refrigerant to bias the beverage container 19 upwardly into engagement with the threaded boss 20 to prevent suspension of a container body 19 by the boss 20 alone to thereby minimize unnecessary strain imposed thereon. A coaxially aligned concave recess 27 is formed within a top surface of the second gel chamber refrigerant to accommodate the bottom contoured surface of the container 19. A refrigerant gel 28 is contained within the second gel chamber refrigerant 24, as illustrated in FIG. 7 for example, as well as within the first gel chamber refrigerant 23.

As to the manner of usage and operation of the instant invention, same should be apparent from the above description accordingly therefore no further discussion relative to the manner of usage of the operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A refrigerated beverage container apparatus comprising:

a combination, an annular beverage container defined by a predetermined height, a contoured bottom surface, and a coaxially aligned threaded container spout formed at an upper end of the beverage container, and the apparatus comprising a tubular central container body including a threaded upper end and a threaded lower end, and a bottom cap threadedly securable to the threaded lower end, and a top cap securable to the threaded upper end, and the bottom cap including a first refrigerant chamber means for receiving the container bottom surface thereon, and the central container body including a second annular refrigerant chamber means defining a coaxially aligned bore therethrough for surroundingly and complementarily receiving the beverage container therewithin, and a top dispensing cap means mounted to the top cap for selectively dispensing a quantity of fluid from the beverage container.

2. Apparatus set forth in claim 1 where in the top dispensing cap means includes an annular conduit mounted on a top surface of the top cap and diametrically disposed thereon, a forward outlet end of the conduit positioned beyond the top cap and the central container body, and a threaded terminal end further including a spout cap threadedly securable thereon, the spout cap including a tether line secured thereto by the first end and secured to the central container body at a second end.

3. Apparatus set forth in claim 2 wherein the conduit further includes a internally threaded tubular boss formed to a bottom surface of the cap in fluid communication with the conduit, the threaded boss threadedly receiving the threaded container spout therewithin.

4. Apparatus set forth in claim 3 wherein the first refrigerant chamber includes a concave upper surface for receiving the contoured body thereon, and further includes a threaded bore therethrough, and a spring positioned within the bottom cap and within the threaded bore and disposed against the contoured bottom surface to bias the beverage container upwardly towards the top cap.

5. Apparatus set forth in claim 4 wherein the top cap includes an internally threaded skirt securable to the threaded upper end, and the bottom cap includes an internally threaded skirt threadedly securable to the threaded lower end.

6. Apparatus set forth in claim 5 further including a U-shaped handle pivotally mounted adjacent the threaded upper end of the central body wherein the U-shaped handle is mounted diametrically disposed about the central container body.

7. Apparatus set forth in claim 6 wherein the first and second refrigerant chamber means each include a refrigerant gel contained therewithin.

8. Apparatus set forth in claim 7 wherein the threaded boss, the beverage container, the spring, and the bore of the second refrigerant chamber means, the bottom cap, and the top cap are coaxially aligned relative to one another.

9. Apparatus set forth in claim 8 wherein the second annular refrigerant chamber means defines an axial height substantially equal to a body defined by the annular beverage container, and further defines an internal diameter substantially equal to external diameter defined by the annular beverage container, and further is defined by an external diameter substantially equal to an internal diameter defined by the central container body.

* * * * *